United States Patent
Gao

(10) Patent No.: US 8,654,053 B2
(45) Date of Patent: Feb. 18, 2014

(54) LIQUID CRYSTAL DISPLAY DEVICE, MANUFACTURING METHOD AND REPAIR METHOD THEREOF

(75) Inventor: Wenbao Gao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 831 days.

(21) Appl. No.: 11/956,930

(22) Filed: Dec. 14, 2007

(65) Prior Publication Data

US 2008/0259009 A1    Oct. 23, 2008

(30) Foreign Application Priority Data

Apr. 17, 2007    (CN) .......................... 2007 1 0065589

(51) Int. Cl.
*G09G 3/36*    (2006.01)

(52) U.S. Cl.
USPC ................... 345/93; 345/87; 345/90; 349/40; 361/56

(58) Field of Classification Search
USPC ........................................................... 345/93
See application file for complete search history.

(56) References Cited

U.S. PATENT DOCUMENTS

| | | | |
|---|---|---|---|
| 4,805,018 A | 2/1989 | Nishimura et al. | |
| 5,002,367 A | 3/1991 | Nicholas | |
| 5,767,927 A * | 6/1998 | Jang | 349/39 |
| 6,043,971 A * | 3/2000 | Song et al. | 361/111 |
| 7,986,379 B2 * | 7/2011 | Lee et al. | 349/40 |
| 2004/0174484 A1 * | 9/2004 | Matsumoto | 349/139 |
| 2005/0180072 A1 | 8/2005 | Lai | |

FOREIGN PATENT DOCUMENTS

| | | |
|---|---|---|
| JP | 61-147285 A | 7/1986 |
| JP | 63-88985 A | 4/1988 |
| JP | 63-221325 A | 9/1988 |
| JP | 1-166020 A | 6/1989 |
| JP | 5-224234 A | 9/1993 |
| JP | 8-106108 A | 4/1996 |
| JP | 11-119253 A | 4/1999 |
| JP | 2001-147649 A | 5/2001 |
| JP | 2002-148658 A | 5/2002 |
| KR | 2004/55249 | 1/2006 |

\* cited by examiner

*Primary Examiner* — Seokyun Moon
(74) *Attorney, Agent, or Firm* — Ladas & Parry LLP

(57) ABSTRACT

A liquid crystal display (LCD) device is provided. The LCD device comprises a data signal line in a first plane and a common electrode line in a second plane, and the common electrode line comprises an intersection region, which is a region where a projection of the common electrode line in the first plane overlaps with a region of the data signal line. The intersection region comprises a plurality of narrow common electrode lines.

10 Claims, 3 Drawing Sheets

LIQUID CRYSTAL DISPLAY DEVICE, MANUFACTURING METHOD AND REPAIR METHOD THEREOF

The present application claims the priority of the Chinese applications No. 200710065589.3 filed in the Chinese Intellectual Property Office on Apr. 17, 2007, the disclosure of which is incorporated herewith by reference.

BACKGROUND OF THE INVENTION

The present invention relates to a liquid crystal display (LCD) device, a manufacturing method and a repair method thereof.

During mass production of the current thin film transistor liquid crystal display (TFT LCD), since the activities like transfer of substrates, contact of equipments, and contact of operators may potentially induce electrostatic (ES) that causes an ES voltage. The ES voltage may induce discharge in a short time and produce current substantially larger than the capability of the active devices within the LCD device, i.e., the external ES is transited to the active devices within the LCD device through the data signal lines and results in breakdown. In a conventional wiring design in the TFT array substrate of the LCD device, the data signal line and the common electrode line are located in layers on different planes, and there is a dielectric layer between the two layers. For convenience of illustration, hereinafter, a region of a common electrode line satisfying the following condition is referred to as an intersection region, that is, in the intersection region, the projection of the common electrode line in the plane of the data signal line overlaps with the data signal line. The ES voltage induced by the activities like transfer of substrates, contact of equipments, and contact of operators may also directly produces a short circuit between the data signal line and the common electrode line, breaks through the dielectric layer between the data signal line and the common electrode line and form a bright line in the LCD device, which may lead to rejected or degraded products.

The well-known electrostatic protection path is generally employed to prevent damages due to electrostatic discharge during the producing process. However, as shown in FIGS. 1 and 2, a data signal line 1 and a common electrode line 2 (which can also be referred to a current discharge line) inevitably intersect with each other to form an intersection region 3 in design, with an overlapping area. The overlapping area is about 200~400 $\mu m^2$. An ES voltage may occur during the manufacturing process and results in breakdown.

In practical producing, with respect to the breakdown due to electrostatic discharge, a typical way to repair is to directly cut off the broken-down common electrode line. As shown in FIG. 3, if the middle intersection region 3 is broken-down and forms an electrostatic breakdown point 5, the common electrode line 2 in the broken-down portion is cut off during repairing. FIG. 3 illustrates the manner of cutting off during the conventional repairing, in which the broken-down region is cut off, for example, portions 4 in FIG. 3 are cut off to avoid a short circuit. Although the conventional manner repairs the broken-down path, since the common electrode line 2 is also used as a current discharge path, after the common electrode line 2 is cut off, the discharge path when the electrostatic occurs is shortened, and problems like image flickering may emerge. Besides, during the subsequent processes, the portion where the discharge path is shortened will become a potential dangerous point, where the electrostatic can not be discharged quickly and thus breakdown may happen once again.

SUMMARY OF THE INVENTION

The conventional LCD device is prone to electrostatic breakdown and an open is formed in the common electrode after repairing, which degrades image quality of the LCD device. In view of the problems, in an embodiment of the present invention, there is provided a novel LCD device with an electrostatic dissipation path design to reduce probability of electrostatic breakdown, the LCD device can be repaired for many times when electrostatic breakdown occurs, and also disadvantageous effect on the image quality after repairing is reduced. The LCD device is, e.g., a thin film transistor LCD (TFT LCD).

According to the first aspect of the present invention, there is provided a LCD device. The LCD device comprises a data signal line in a first plane and a common electrode line in a second plane, the common electrode line comprises an intersection region, which is a region where a projection of the common electrode line in the first plane overlaps with a region of the data signal line, and the intersection region comprises a plurality of narrow common electrode lines.

Preferably, the plurality of narrow common electrode lines in the intersection region have a uniform width.

Preferably, the plurality of narrow common electrode lines are equal in length.

Preferably, a length of the plurality of narrow common electrode lines is equal to or greater than a width of the data signal lines.

Preferably, the plurality of narrow common electrode lines are formed in a slit structure.

In a conventional LCD device, a common electrode line intersects with a data signal line at the intersection region and is integrated with other portions outside the intersection region. However, in the LCD device according to the embodiment of the present invention, a plurality of narrow common electrode lines is formed in the intersection region. During producing process, the portions where electrostatic breakdown easily occurs mainly are the intersection regions between the data signal lines and the common electrode lines.

According to the second aspect of the present invention, there is provided a method for manufacturing a LCD device. The LCD device comprises a data signal line in a first plane and a common electrode line in a second plane, and the common electrode line comprises an intersection region, which is a region where a projection of the common electrode line in the first plane overlaps with a region of the data signal line. In the manufacture of the LCD device, during forming the common electrode line, a plurality of narrow common electrode lines are formed in the intersection region of the common electrode line.

Preferably, a slit structure is formed in the intersection region so as to form the plurality of narrow common electrode lines.

According to the third aspect of the present invention, there is provided a method for repairing a LCD device. The LCD device comprises a data signal line in a first plane and a common electrode line in a second plane, the common electrode line comprises an intersection region, which is a region where a projection of the common electrode line in the first plane overlaps with a region of the data signal line, and the intersection region comprises a plurality of narrow common electrode lines. When an electrostatic breakdown occurs in the intersection regions of the common electrode line, a broken-down narrow common electrode line among the plurality of narrow common electrode lines is cut off.

Preferably, the broken-down narrow common electrode line is cut off by using laser light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DETAILED DESCRIPTION

Figure 1:
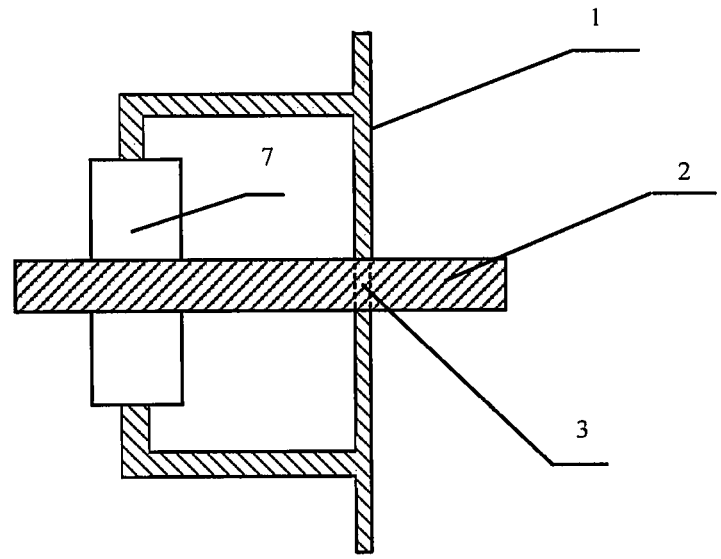
FIG. 1 is a schematic diagram for a conventional antistatic protection circuit.
Figure 2:
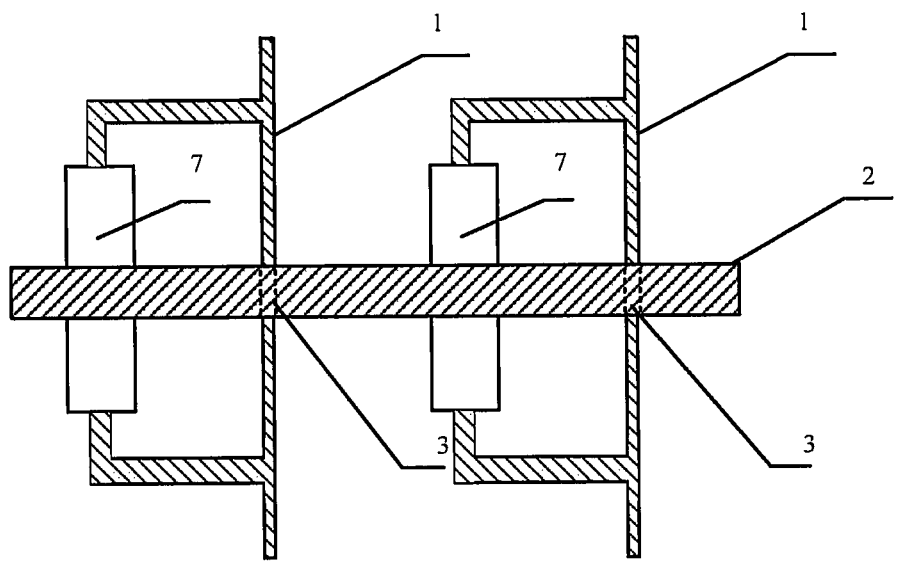
FIG. 2 is a schematic diagram for another conventional antistatic protection circuit.
Figure 3:
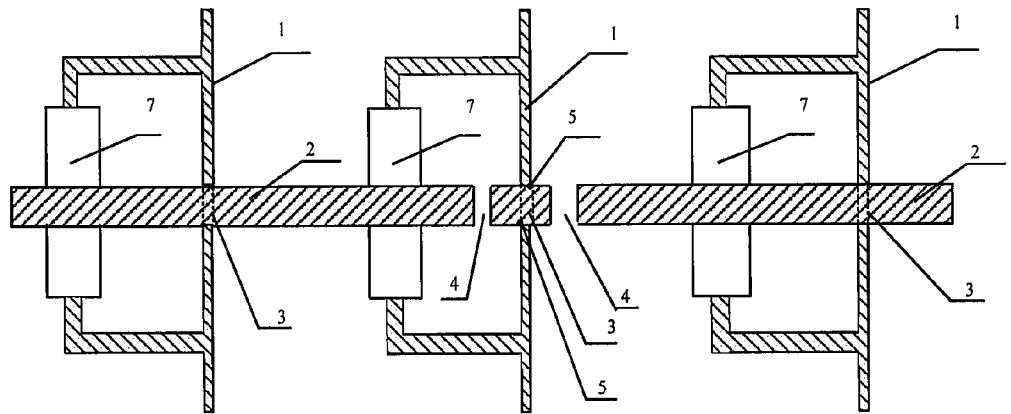
FIG. 3 is a schematic diagram showing repairing of the conventional antistatic protection circuit.

The exemplary embodiments according to the present invention will be described in detail with reference to the accompanying drawings. This invention may, however, be embodied in many different forms and should not be construed as limited to the embodiments set forth herein. In the context, it will be understood that when an element or layer is referred to as being "on" or "connected to" another element or layer, it can be directly on or connected to the other element or layer, or an intervening element or layer may be present therebetween. Hereinafter, for simplicity, the parts in the present invention corresponding to those in the related art share the same reference numeral.

Figures 4, 5:
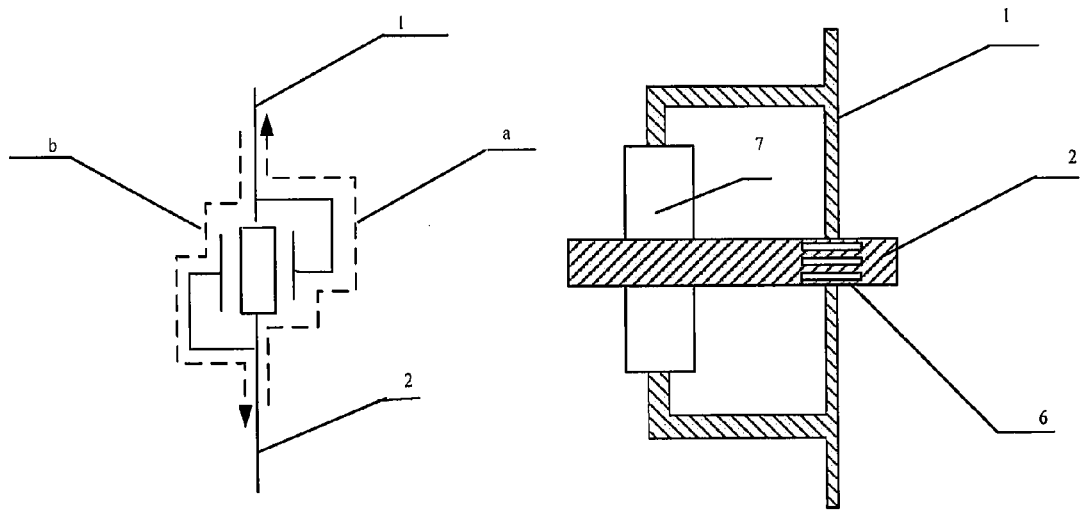
FIG. 4 is a circuit diagram showing the operating principle of an antistatic protection circuit.
FIG. 5 is a schematic showing the structure of the first embodiment of the present invention.

A liquid crystal display (LCD) device such as a thin film transistor liquid crystal display (TFT LCD) device can be realized by the standard semiconductor processes. As shown in FIG. 4, an antistatic protection circuit 7 (also called an electrostatic short-circuit ring) is formed by connecting two thin film transistors (TFTs). The gate and the source electrodes of one of the TFTs are both connected with the data signal line 1, and the drain electrode is connected with the common electrode line 2. The gate and the source electrodes of the other TFT are both connected with the common electrode line 2, and the drain electrode is connected with the data signal line 1, thereby forming an electrostatic discharge path. When a positive high voltage is applied via the data signal line 1, the first TFT operates to discharge the current into the common electrode line 2, forming a current as indicated by "b" in FIG. 4; when a negative high voltage is applied via the data signal line 1, the second TFT operates to discharge current from the common electrode 2 into the data signal line 1, forming a current as indicated by "a" in FIG. 4.

The present invention can be implemented in various embodiments. The embodiments according to the present invention will be described by way of example with reference to the accompanying drawings, and the present invention is not limited to these embodiments. Those ordinary skilled in the art will appreciate that the specific embodiments disclosed hereinafter are only examples among various structures, and other embodiments in which a plurality of narrow common electrode lines are arranged in the intersection regions still fall within the spirit and scope of the present invention.

FIG. 5 is a schematic showing the structure of the first embodiment. As shown in FIG. 5, the array substrate of a LCD device according to the first embodiment comprises a data signal line 1 in the first plane and a common electrode line 2 in the second plane, and the first plane and the second plane are separated by a dielectric layer, for example. The common electrode line 2 comprises an intersection region, where the projection of the common electrode line 2 in the first plane overlaps with a region of the data signal line 1. Furthermore, in the intersection region, the common electrode line 2 comprises a plurality of narrow common electrode lines 6 (for example, four narrow common electrode lines), which are arranged in parallel and form a slit structure.

In this embodiment, the data signal line 1 is connected with the electrostatic discharge device 7. In the electrostatic dissipation path (as shown in FIG. 4), two identical TFTs are connected together. When a high voltage is applied from a terminal, one of the two connected TFTs in the electrostatic dissipation path is turned on to form a closed circuit. The high voltage is discharged into the neighboring data signal line through the electrostatic discharge device 7, and this high voltage absorbed by the active regions in the whole LCD device through the common electrode to form equal potential all over the LCD device. Thus, the generated large current will not concentrate on one data signal line and bring about damages to the active devices. Also, the high voltage generated inside the LCD device is discharged to outside in a similar way. The details of the data electrode line and the common electrode line are well known for those skilled in the art, which are not described in detail herein. In design for electrostatic discharge, the electrostatic discharge device 7 can be equivalent to a voltage-regulation diode with a given voltage threshold, and during applying a normal signal, the signal will not be conducted too much into the common electrode line to result in signal loss.

As shown in FIG. 5, in the first embodiment, the plurality of narrow common electrode lines 6 in parallel have a uniform width and are equal in the length. In the first embodiment, the overlapping area of the intersection region with respect to the data signal line is reduced, and the induced capacitance of the data signal line is reduced correspondingly. Since time delay in the data signal line is proportional to the capacitance, influence on the delay in the data signal line is also reduced.

Figure 6:
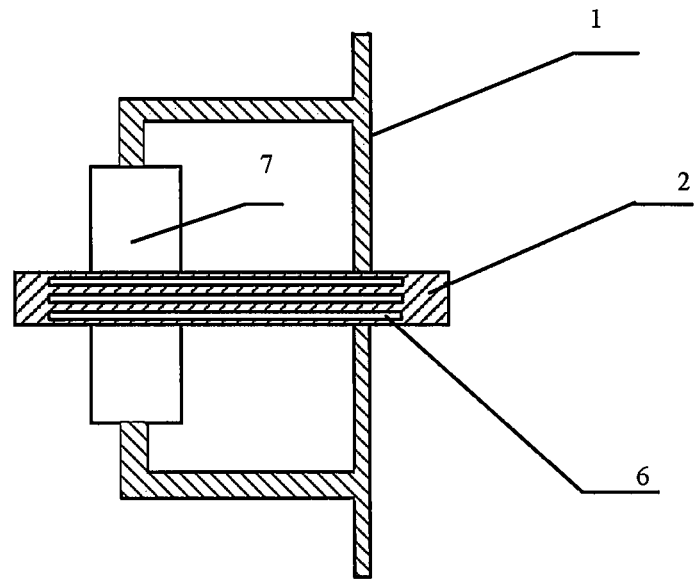
FIG. 6 is a schematic showing the structure of the second embodiment of the present invention.

FIG. 5 shows a specific embodiment of the present invention only. The embodiment is only illustrative and not limitative of the scope of the present invention. Those skilled in the art will appreciate that, the width and length of the plurality of narrow common electrode lines 6 in the embodiment can be modified according to design and process. For example, as shown in FIG. 6, the length of the plurality of narrow common electrode lines 6 can be modified to be larger that the width of the data signal lines 1, and can be also extended to other portions of the common electrode line 2.

The length of the plurality of narrow common electrode lines 6 can also be equal to the width of the data signal lines 1. The widths of the plurality of narrow common electrode lines 6 can also be different from each other.

As can be seen from the above embodiment, in the present invention, the intersection region 3 comprises a plurality of narrow common electrode lines to form a slit structure compared with other portions of the common electrode line. However, in the conventional technique, the intersection region is provided as it is and is integral with the portions other than the intersection region. Indeed, the shape and width of the plurality of narrow common electrode lines can be modified or changed, which does not depart from the spirit of the present invention.

Figure 7:
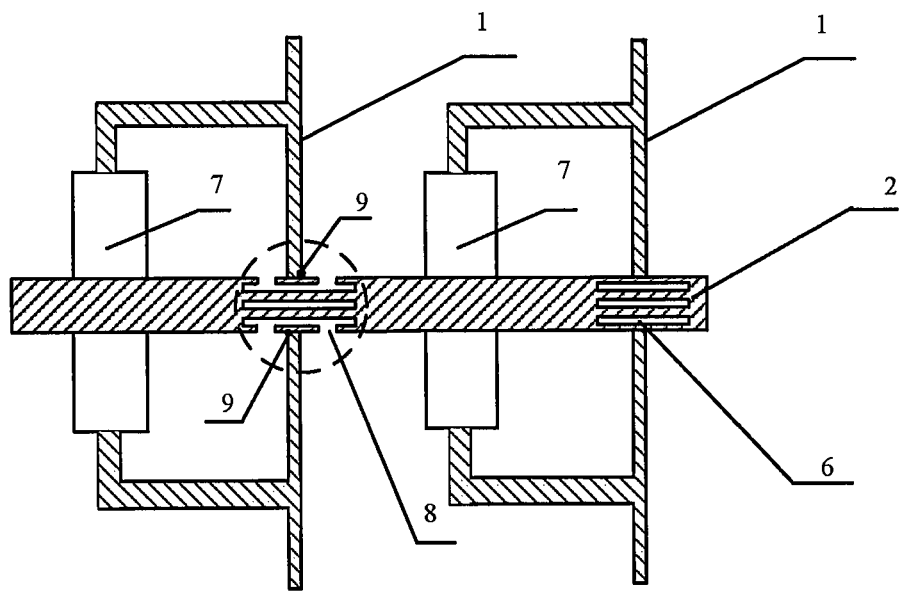
FIG. 7 is a schematic showing the structure when electrostatic breakdown has been repaired according to the present invention.

FIG. 7 is a schematic showing the structure when electrostatic breakdown has been repaired according to the present invention. As shown in FIG. 7, among the plurality of narrow common electrode lines 6 in parallel, for example, the first and fourth ones are broken-down due to electrostatic discharge, indicated by the electrostatic broken-down point 9. During repairing, it is only necessary to cut off (e.g., by using laser light) the broken-down first and fourth narrow common electrode lines 6, while the other narrow common electrode lines 6 are still in operation for conducting. The cut-off positions are indicated by reference number 8 in FIG. 7. Unlike repairing in the conventional LCD, an incomplete cut-off is adopted in the present invention. When some narrow common electrode line in the intersection region is electrostatic broken-down, it is to only cut off the broken-down narrow common electrode line, and the remaining unbroken-down narrow common electrode lines in parallel can still make up a current discharge path. Therefore, the electrostatic discharge path will not be shortened, and the LCD device can be repaired for many times while the common electrode lines are not completely cut off. Furthermore, since the common electrode lines are not cut off completely during repairing and still make up a current discharge path, the case in which the cut-off portion is not uniform in potential can be avoided, the electrostatic can be still discharged along the common electrode lines, which will not influence the antistatic capability during the subsequent processes and also reduce the disadvantageous effect on the subsequent image quality.

In a preferred embodiment of the present invention, during formation of the common electrode lines in the manufacturing process of the TFT array substrate of the LCD device, common electrode lines are formed by a serial of processes of deposition of a conductive layer, exposure, and etching, and the slit structure is formed at the same time by such serial of processes like deposition, exposure, and etching in the intersection regions of the common electrode lines with respect to the data signal lines, thereby forming a plurality of narrow common electrode lines in the intersection regions. As shown in FIG. 5, a plurality of slits (e.g., three slits) are formed extending in parallel along the direction of the common electrode lines 2 so as to form a plurality of narrow common electrode lines 6 (e.g., four narrow common electrode lines) in one intersection region.

The above disclosure only presents some exemplary embodiments of the present invention, and those skilled in the art will appreciate that there may be various forms in order to meet different requirements, as long as these modifications fall within the spirit of the present invention with arranging a plurality of narrow common electrode lines in the intersection regions.

In view of the above, in the present invention, a plurality of narrow common electrode lines are formed in the intersection regions of convention common electrode lines with respect to the data signal line to achieve a structure with one or more slits, and the following beneficial effects can be obtained:

1. The area of the intersection region can be reduced so as to effectively reduce probability of electrostatic break-down.

2. In case that some narrow common electrode line in the intersection region is broken-down due to electrostatic discharge, the remaining narrow common electrode lines which are not broken-down can still make up a current discharge path, so that the electrostatic discharge path will not be shortened, and the LCD device can be repaired for many times while the common electrode lines are not completely cut off.

3. The common electrode lines are not completely cut off during repairing and can still make up a current discharge path, so that there will be no non-uniform potential in the cut-off portion and the electrostatic can be discharged along the repaired common electrode lines. Therefore, it is advantageous to prevent electrostatic in the subsequent processes, and the disadvantageous effect on the image quality can also be reduced effectively.

4. The overlapping area of the intersection region is reduced in structure design, which reduces the induced capacitance between the data signal line and influence on the delay in the data signal line.

It should be appreciated that the embodiments described above are intended to illustrate but not limit the present invention. Although the present invention has been described in detail herein with reference to the preferred embodiments, it should be understood by those skilled in the art that the present invention can be modified and equivalently substituted without departing from the spirit and scope of the present invention.

What is claimed is:

1. A liquid crystal display (LCD) device, comprising:
a data signal line in a first plane,
a common electrode line in a second plane, and
an electrostatic discharge device which is connected to the data signal line,
wherein the common electrode line comprises an intersection region, which is a region where a projection of the common electrode line in the first plane overlaps with a region of the data signal line, and wherein the intersection region consists of a plurality of narrow common electrode lines,
wherein the data signal line and the common electrode line intersect with each other, the common electrode line intersects with the electrostatic discharge device, all the plurality of narrow common electrode lines in the intersection region have a uniform width, and the narrow common electrode lines are extended from the intersection region to and intersect with the electrostatic discharge device.

2. The LCD device according to claim 1, wherein the plurality of narrow common electrode lines are equal in length.

3. The LCD device according to claim 1, wherein a length of the plurality of narrow common electrode lines is greater than a width of the data signal line.

4. The LCD device according to claim 1, wherein the plurality of narrow common electrode lines are formed in a slit structure.

5. A method for manufacturing a liquid crystal display (LCD) device, the LCD device comprising a data signal line in a first plane, a common electrode line in a second plane, an electrostatic discharge device which is connected to the data signal line, wherein the common electrode line comprises an intersection region, which is a region where a projection of the common electrode line in the first plane overlaps with a region of the data signal line, the common electrode line intersects with the electrostatic discharge device, the method comprising:

during forming the common electrode line, forming the intersection region consisting of a plurality of narrow common electrode lines of the common electrode line, wherein the data signal line and the common electrode line intersect with each other, all the plurality of narrow common electrode lines in the intersection region have a uniform width, and the narrow common electrode lines are extended from the intersection region to and intersect with the electrostatic discharge device.

6. The method according to claim 5, wherein the plurality of narrow common electrode lines are equal in length.

7. The method according to claim 5, wherein a length of the plurality of narrow common electrode lines is greater than a width of the data signal line.

8. The method according to claim 5, wherein the plurality of narrow common electrode lines are formed in a slit structure.

9. A method for repairing a liquid crystal display (LCD) device, the LCD device comprising a data signal line in a first plane, a common electrode line in a second plane, an electrostatic discharge device which is connected to the data signal line, wherein the common electrode line comprises an intersection region, which is a region where a projection of the common electrode line in the first plane overlaps with a region of the data signal line, and the intersection region consists of a plurality of narrow common electrode lines, the method comprising:

when electrostatic breakdown occurs in the intersection region, a broken-down narrow common electrode line among the plurality of narrow common electrode lines is cut off, wherein the data signal line and the common electrode line intersect with each other, the common electrode line intersects with the electrostatic discharge device, all the plurality of narrow common electrode lines in the intersection region have a uniform width, and the narrow common electrode lines are extended from the intersection region to and intersect with the electrostatic discharge device.

10. The method for repairing according to claim 9, wherein the broken-down narrow common electrode line is cut off by using laser light.

\* \* \* \* \*